United States Patent
Mende, Jr. et al.

(10) Patent No.: US 6,393,533 B1
(45) Date of Patent: May 21, 2002

(54) METHOD AND DEVICE FOR CONTROLLING ACCESS TO MEMORY

(75) Inventors: Robert G. Mende, Jr., Boulder Creek; John E. Schimmel, Manteca, both of CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/270,613

(22) Filed: Mar. 17, 1999

(51) Int. Cl.[7] .............................................. G06F 12/00
(52) U.S. Cl. ........................ 711/156; 711/150; 707/201
(58) Field of Search ................................. 711/156, 142, 711/150, 151, 141, 145, 147; 707/8, 201, 203

(56) References Cited

U.S. PATENT DOCUMENTS

| | | | |
|---|---|---|---|
| 5,301,290 A | * 4/1994 | Tetzlaff et al. ............... | 711/142 |
| 5,590,326 A | * 12/1996 | Manabe ....................... | 711/156 |
| 6,105,025 A | * 8/2000 | Jacobs et al. .................. | 707/8 |
| 6,122,659 A | * 9/2000 | Olnowich .................... | 709/213 |
| 6,125,371 A | * 9/2000 | Bohannon et al. ........... | 707/203 |
| 6,128,627 A | * 10/2000 | Mattis et al. ................ | 707/202 |
| 6,256,712 B1 | * 7/2001 | Challenger et al. ......... | 711/141 |

* cited by examiner

Primary Examiner—Matthew Kim
Assistant Examiner—C. P. Chace
(74) Attorney, Agent, or Firm—Baker Botts L.L.P.

(57) ABSTRACT

A computing device (12) includes a first process (16) and a second process (18) executing thereon in conjunction with a local memory (20). The local memory (20) stores data files retrieved from a database (14). The database (14) maintains the data files in page formats. Each page (22) maintained within the database (14) includes a counter location (24). The first process (16), desiring to write access a particular page (22), increments the counter location (24). The counter location (24) provides an indication that the contents of the particular page (22) are not valid. The second process (18), desiring to read or write access the particular page (22), determines that the particular page (22) is not in a valid state according to the counter location (24). The first process (16), upon terminating write access to the particular page (22), increments the counter location (24). The counter location (24) now provides an indication that the contents of the particular page (22) are in a valid state. The second process (18), determining that the counter location (24) indicates that the contents are in a valid state, write accesses the particular page (22) by incrementing the counter location (24) or read access the particular page (22) by storing a value of the counter location (24).

20 Claims, 2 Drawing Sheets

METHOD AND DEVICE FOR CONTROLLING ACCESS TO MEMORY

TECHNICAL FIELD OF THE INVENTION

The present invention relates in general to computer processing and more particularly to a method and device for controlling access to memory.

BACKGROUND OF THE INVENTION

In a computing environment where a database is shared among various programs, it is difficult to ensure that each program is working with valid data from the database. One program may have changed the contents of the data while another program is using the old contents of the data. As a result, programs may unknowingly be working with corrupted data.

One technique to avoid using corrupted data is providing a copy of the database to all programs executing in the computing environment. However, this technique does not allow for simultaneous reading and writing by more than one program. Another technique to guaranteeing uncorrupted data is through a separate locking program that supervises all access to the database. This technique ensures that the database has valid data at all times for use by the programs in the computing environment. The drawbacks of this technique include the delays involved in constantly accessing the database and the additional overhead processing required for the separate locking program.

Therefore, it is desirable to provide a controlled access to a database where each program operating in the computer environment can be provided valid data from the database.

SUMMARY OF THE INVENTION

From the foregoing, it may be appreciated that a need has arisen for a database access technique that allows multiple programs to perform read and write access to valid data in the database. In accordance with the present invention, a method and device for controlling access to memory are provided that substantially eliminate or reduce disadvantages and problems associated with conventional database management operations.

According to an embodiment of the present invention, there is provided a computing device for controlling access to memory that includes a first process and a second process each operable to execute on the computing device. The computing device also includes a database memory for storing data files in page formats. A local memory receives a page from the database memory in response to an access request from the first process. The page includes a counter location that is incremented upon being write accessed by the first process. Upon incrementing, the counter location provides an indication to the second process that the contents of the page are not currently valid. The present invention may also be extended into a network environment with multiple computing devices each having multiple processes sharing data from a common database.

The present invention provides various technical advantages over conventional database management operations. For example, one technical advantage is to eliminate the use of a database manager program. Another technical advantage is in providing a locking protocol within the data stored in a database. Yet another technical advantage is ensure that processes operating in a computing environment do not use corrupted data. Still another technical advantage is to provide an indication to a process desiring access to data as to whether the data is in a valid state. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description, taken in conjunction with the accompanying drawings, wherein like reference numerals represent like parts, in which.

DETAILED DESCRIPTION OF THE DRAWINGS

Figure 1:
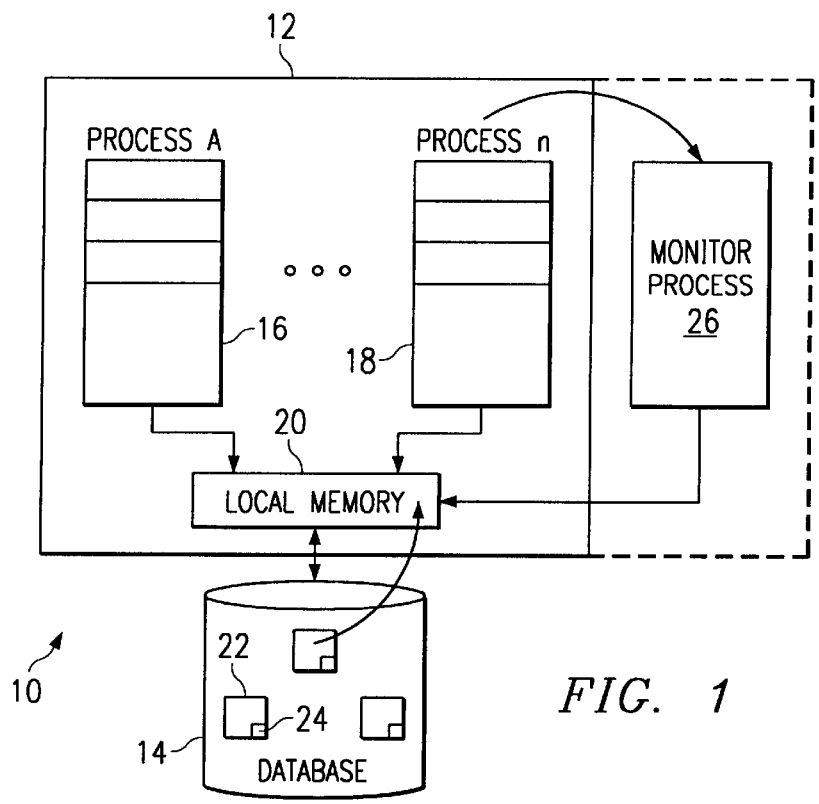
FIG. 1 illustrates a block diagram of a computing environment.

FIG. 1 is a block diagram of a computing environment 10. Computing environment 10 includes a computing device 12 and a database 14. Computing device 12 has one or more processes, such as process 16 and process 18, being executed by computing device 12. Computing device 12 also includes a local memory 20 to store data for use by process 16 and process 18. Database 14 includes the data files to be stored in local memory 20 for use by process 16 and process 18.

Figure 2:
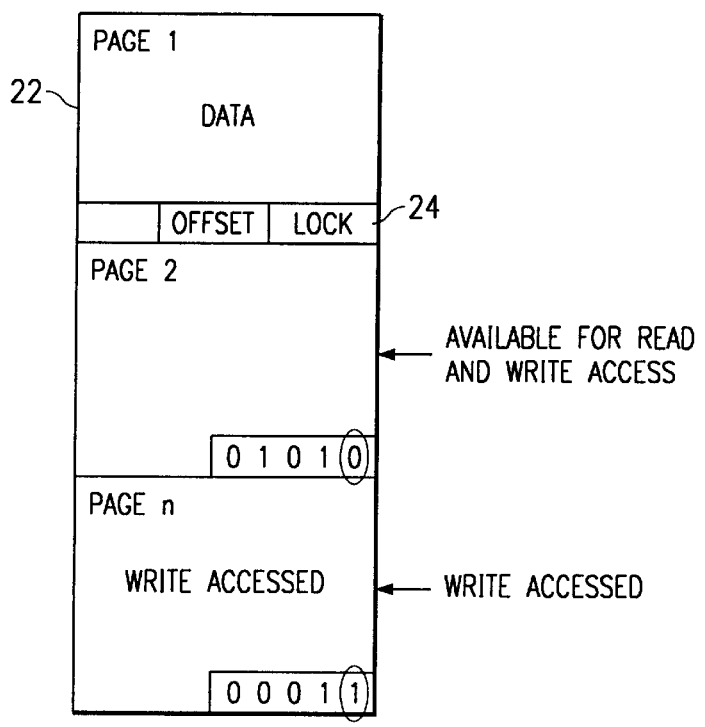
FIG. 2 illustrates a page format for data stored in a database of the computing environment.

Database 14 maintains data files in variable length page formats. Data files may be maintained in database 14 in any location wherein pages associated with a particular data file need not be located contiguously with other pages of the particular data file. FIG. 2 shows an example of the format for each page 22 maintained in database 14. Each page 22 includes a counter location 24 that is incremented each time that particular page 22 is write accessed by one of process 16 and process 18. When one of process 16 and process 18 has terminated a write access to page 22, counter location 24 is incremented to indicate that page 22 has valid data and is available to be read or write accessed.

In operation, process 16 requests write access to a particular page 22. The particular page 22, if not already stored in local memory 20, is retrieved from database 14 and mapped into local memory 20. If counter location 24 indicates that the contents of the particular page 22 are in a valid state, process 16 increments counter location 24 of the particular page 22. Upon being incremented, counter location 24 provides an indication that the particular page 22 is being write accessed by a process and does not contain valid data. This indication may be provided by the least significant bit of the counter location being in a logic level "1" state. If at this time process 18 attempts to access the particular page 22, process 18 will check counter location 24 of the particular page 22 and see that the least significant bit is in the logic level "1" state. Process 18 will continue and wait to read or write access the particular page 22 until process 18 sees a logic level "0" state in the least significant bit of counter location 24. Upon seeing a logic level "0" state in the least significant bit of counter location 24, process 18 can write access the particular page 22 by incrementing counter location 24, thus placing the least significant bit of counter location 24 in the logic level "1" state.

When process 16 is finished write accessing the particular page 22, process 16 compares a current value of counter location 24 to an expected value of counter location 24. If the current value of counter location 24 equals the expected value of counter location 24, process 16 performs any changes to the contents of the particular page 22. Upon terminating write access to the particular page 22, process 16 increments counter location 24 and places its least significant bit into a logic level "0" state. The particular page 22 is now available for read or write access by any process executing on computing device 12.

If the current value of counter location 24 does not equal the expected value of counter location 24, process 16 does not change the contents of the particular page 22. In this instance, process 16 determines that the particular page 22 has been read or write accessed by another process that has overridden the write access priority that process 16 had with the particular page 22. Subsequently, process 16 may attempt to re-access the particular page 22 in order to re-perform the operations that affected the contents of the particular page 22 in order to make the changes to the contents of the particular page 22.

The ability to override a write access priority to the particular page 22 may be controlled by a monitor process 26. If process 16 has write access to the particular page 22, the least significant bit of counter location 24 of the particular page 22 is in the logic level "1" state. Process 18, desiring to read or write access the particular page 22, determines that counter location 24 of the particular page 22 is in the logic level "1" state. Process 18 will not perform any further execution until it can obtain read or write access to valid data of the particular page 22 depending upon the operation to be performed. If process 18 continues to see a logic level "1" state in the least significant bit of counter location 24 of the particular page 22 for an inordinate amount of time, process 18 will send a release request to monitor process 26. Monitor process 26 restores the particular page 22 in local memory 20 and increments its counter location 24 such that the least significant bit is in a logic level "0" state. Process 18, determining that the least significant bit is now in a logic level "0" state, can now write access the particular page 22 by incrementing counter location 24. This override mechanism prevents a process from tying up read or write access to memory that may affect overall operation of computing device 12.

Process 16 and process 18 may read the particular page 22 at any time, and simultaneously, when the least significant bit of counter location 24 is at a logic level "0" state. Unlike during a write access, counter location 24 is not incremented for a read access to the particular page 22. For a read access, process 16 and/or process 18 stores the value of counter location 24. After an operation is performed using the data in the particular page 22, process 16 and/or process 18 compares the stored value of counter location 24 to a current value to see if the contents of the particular page have changed during performance of the operation. If not, then process 16 and/or process 18 proceed to other operations. If so, process 16 and/or process 18 may re-perform the operation on the new data within the particular page 22.

Figure 3:
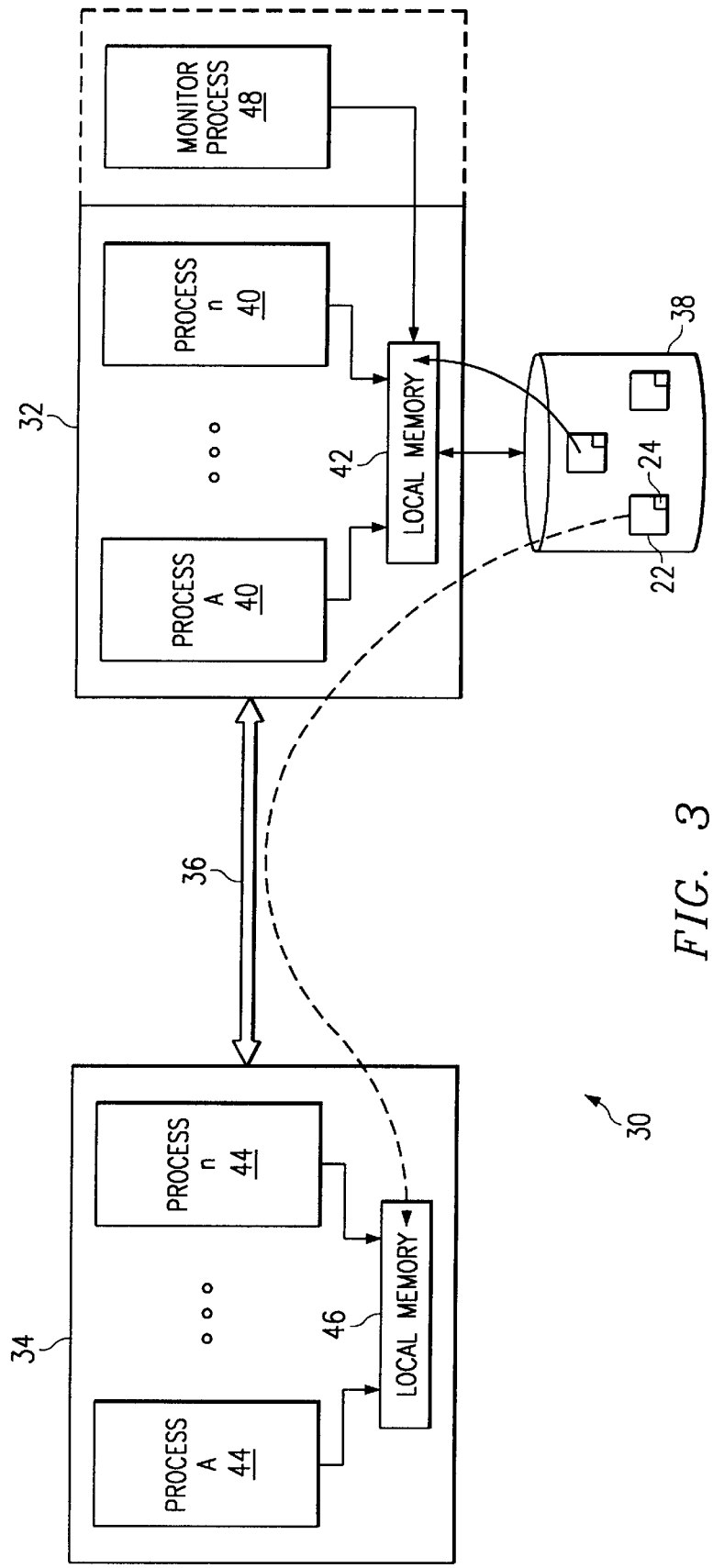
FIG. 3 illustrates a network environment with multiple computing environments having access to the same database.

The memory control technique of the present invention may be extended to a network environment. FIG. 3 is a block diagram of a network environment 30. Network environment 30 includes a plurality of computing devices, such as a first computing device 32 and a second computing device 34. First computing device 32 and second computing 34 may be similar to computing device 12. First computing device 32 and second computing device 34 are connected by a link 36. Link 36 may be any type of computer communication link, including such connections as an Ethernet connection. First computing device 32 and second computing device 34 share data maintained in a database 38. First computing device 32 includes a plurality of processes 40 executing thereon in conjunction with a local memory 42. Similarly, second computing device 34 includes a plurality of processes 44 executing thereon in conjunction with a local memory 46. As discussed above, database 38 maintains data files in page formats. Each page 22 includes a counter location 24 to indicate whether the contents of page 22 has valid data or is being write accessed by another process.

In operation, a process 44 in second computing device 34 may request read or write access to a particular page 22. The particular page 22, if not already resident in local memory 46, is mapped into local memory 46 from database 38 over link 36. Process 44 determines whether the particular page 22 has valid data by checking its counter location 24. If counter location 24 has a logic level "1" state in its least significant bit, process 44 determines that the particular page 22 is in use by another process and does not contain valid data. Process 44 will continue to request read or write access to the particular page 22 until it determines that the least significant bit of counter location 24 is at a logic level "0" state. If a pre-determined period of time elapses with the least significant bit of counter location 24 still in the logic level "1", then process 44 may send a release request to a monitor process 48 in order to obtain read or write access to the particular page 22. Once process 44 senses a logic level "0" state in the least significant bit of counter location 24, process 44 increments counter location 24 to indicate that the particular page is being accessed by a process and its data is not valid. For a read access, process 44 stores the value of counter location 24, performs its operation using the data from the particular page, and compares the stored value to the current value of counter location 24 to determine whether a successful operation was performed with valid data.

Through the use of this read and write access protocol, multiple reader and writer processes may be acting on the database information simultaneously without contacting a third party process. Accessing pages in the database has similar performance characteristics as reading a piece of memory in a computing device. There is no performance penalty for inter-process communication and context switch for a memory call. Even if every process uses the same page, better performance is achieved through this access mechanism than with a traditional database locking system.

Thus, it is apparent that there has been provided, in accordance with the present invention, a method and device for controlling access to memory that satisfies the advantages set forth above. Although the present invention has been described in detail, various changes, substitutions, and alterations may be used herein. For example, though described as using logic level "0" and logic level "1" states in the least significant bit, counter location 24 may use an alternate mechanism to indicate whether the particular page 22 has valid data. Other examples may be readily ascertainable by those skilled in the art and may be made herein without departing from the spirit and scope of the present invention as defined by the following claims.

What is claimed is:

1. A computing device for controlling access to memory comprising:

a first process operable to execute on the computing device;

a second process operable to execute on the computing device;

a local memory shared by the first process and the second process, the local memory operable to receive a page of data from a database in response to an access request from the first process, the page including a counter location, the firsts process operable to determine that the page is accessible in response to the counter location, the first process operable to increment a value in the counter location upon write accessing the page in response to the page being accessible, the first process operable to compare an actual value in the counter location to an expected value upon completing the write access to the page, the first process operable to update the page if response to the actual value equaling the expected value.

2. The computing device of claim 1, wherein the counter location provides an indication to the second process that the data within the page is not in an accessibly valid state.

3. The computing device of claim 1, wherein the first process increments the value in the counter location upon terminating write access to the page.

4. The computing device of claim 3, wherein the counter location provides an indication that the page has valid data.

5. The computing device of claim 3, wherein the local memory stores the page in the database upon write access termination.

6. The computing device of claim 2, further comprising:
a monitor process operable to receive a request from the second process in response to the second process determining that the page has been in an invalid state for a predetermined period of time, the monitor process operable to restore the page in the local memory, the monitor operable to increment the value in the counter location and place the page in an accessibly valid state.

7. The computing device of claim 6, wherein the second process is operable to increment the value in the counter location and obtain write access to the page.

8. The computing device of claim 7, wherein the second process is operable to increment the value in the counter location upon terminating write access to the page.

9. The computing device of claim 6, wherein the first process is unable to update the contents of the page in response to the current value not being equal to the expected value.

10. The computing device of claim 6, wherein the first process performs another access request of the page in response to the current value not being equal to the expected value.

11. A method of controlling access to memory, comprising:
requesting access to a page of data from a database;
determining whether a counter location associated with the page indicates that the page has valid data;
incrementing a value in a counter location associated with the page to write access the page, the counter location providing an indication that the page does not have valid data.

12. The method of claim 11, further comprising:
comparing a current value of the counter location to an expected value;
modifying the page in response to the current value being equal to the expected value;
incrementing the value in the counter location upon terminating write access to the page, the counter location providing an indication that the page has valid data and is available for read or write access.

13. The method of claim 11, further comprising:
comparing a current value of the counter location to an expected value;
requesting a new access to the page in response to the current value not being equal to the expected value.

14. The method of claim 11, further comprising:
requesting release of the page in response to determining that the counter location indicates that the page has had invalid data for a predetermined period of time.

15. The method of claim 14, further comprising:
recovering the page from the database in response to the release request.

16. A network for controlling access to a shared memory, comprising:
a first computing device having a first process executing thereon;
a second computing device having a first process executing thereon;
a database having pages of data shared by the first and second computing device, each page having a counter location, the first process of the first processing device operable to determine that the page is accessible in response to the counter location, the first process of the first computing device write accessing a particular page of the database by incrementing a value in its counter location in response to the page being accessible, the counter location providing an indication that contents of the page are not valid to the first process of the second computing device.

17. The network of claim 16, wherein the first process of the first computing device increments the value in the counter location of the particular page upon updating the contents of the particular page and terminating write access to the particular page.

18. The network of claim 16, wherein the first process of the first computing device compares a current value of the counter location to an expected value prior to updating the contents of and terminating write access to the particular page.

19. The network of claim 17, wherein the counter location indicates that the contents of the page are valid and available for read or write access by any of the first process of the first computing device and the first process of the second computing device.

20. The network of claim 16, wherein the first computing device restores the particular page for read or write accessibility upon request from the first process of the second computing device in response to the particular page not having valid content for a predetermined continuous period of time.

* * * * *